US010970845B2

(12) United States Patent
Fukuoka

(10) Patent No.: US 10,970,845 B2
(45) Date of Patent: Apr. 6, 2021

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Shigeo Fukuoka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 373 days.

(21) Appl. No.: 16/004,989

(22) Filed: Jun. 11, 2018

(65) Prior Publication Data
US 2018/0365837 A1 Dec. 20, 2018

(30) Foreign Application Priority Data

Jun. 14, 2017 (JP) .............................. JP2017-117235

(51) Int. Cl.
G06T 7/13 (2017.01)
G06K 9/00 (2006.01)
(Continued)

(52) U.S. Cl.
CPC ............ *G06T 7/13* (2017.01); *G06K 9/00449* (2013.01); *G06K 9/6211* (2013.01); *G06T 7/174* (2017.01);
(Continued)

(58) Field of Classification Search
CPC ........... G06T 7/13; G06T 7/174; G06T 7/337; G06T 2207/20221; H04N 1/3876; H04N 5/23229; G06K 9/6211; G06K 9/00449
See application file for complete search history.

(56) References Cited

U.S. PATENT DOCUMENTS 6,038,074 A * 3/2000 Kitaguchi .............. G01C 11/06
128/916
6,360,028 B1 * 3/2002 Kaji ..................... G06K 9/3208
358/488
(Continued)

FOREIGN PATENT DOCUMENTS

CN 101192269 A 6/2008
CN 101267493 A 9/2008
(Continued)

OTHER PUBLICATIONS

May 28, 2020 Chinese Official Action in Chinese Patent Appln. No. 201810615586.0.

(Continued)

*Primary Examiner* — Xuemei G Chen
(74) *Attorney, Agent, or Firm* — Venable LLP

(57) ABSTRACT

It is possible to calculate transformation parameters used for image combining with a small error and to reduce a distortion that appears in a combined image The image processing apparatus includes: a feature point extraction unit configured to extract feature points corresponding to each other between both images from each of a first image and a second image, which are images obtained by capturing a paper document and whose captured ranges are different from each other; an edge extraction unit configured to extract edges corresponding to each other between both images from each of the images; a vanishing point detection unit configured to detect a vanishing point of a plane to which the paper document belongs from each of the images; a transformation parameter derivation unit configured to derive transformation parameters for image combining by using coordinates corresponding to intersections of straight lines connecting the feature points and the vanishing point, and the edges; and an image combining unit configured to combine the first (Continued)

image and the second image by using the transformation parameters.

11 Claims, 10 Drawing Sheets

(51) Int. Cl.
  *H04N 1/387*    (2006.01)
  *G06K 9/62*     (2006.01)
  *G06T 7/174*    (2017.01)
  *G06T 7/33*     (2017.01)
(52) U.S. Cl.
  CPC ........... *G06T 7/337* (2017.01); *H04N 1/3876* (2013.01); *G06T 2207/20221* (2013.01)

(56) References Cited

U.S. PATENT DOCUMENTS

| | | | | |
|---|---|---|---|---|
| 6,947,076 | B1* | 9/2005 | Kitaguchi | H04N 5/232 348/218.1 |
| 7,268,803 | B1* | 9/2007 | Murata | G06T 3/4038 348/218.1 |
| 7,295,699 | B2* | 11/2007 | Ohba | G01C 11/06 382/154 |
| 7,486,310 | B2 | 2/2009 | Sakurai et al. | |
| 3,045,804 | A1 | 10/2011 | Zeng et al. | |
| 8,120,665 | B2* | 2/2012 | Maruyama | G06T 7/12 348/222.1 |
| 8,170,368 | B2 | 5/2012 | Yin et al. | |
| 9,521,317 | B2* | 12/2016 | Yu | H04N 5/23229 |
| 9,834,153 | B2* | 12/2017 | Gupta | G06T 7/85 |
| 10,289,924 | B2* | 5/2019 | Campbell | G06K 9/32 |
| 10,348,961 | B2* | 7/2019 | Bae | H04N 5/23229 |
| 2005/0078192 | A1 | 4/2005 | Sakurai et al. | |
| 2006/0038962 | A1* | 2/2006 | Matsumoto | H04N 9/3185 353/69 |
| 2007/0206877 | A1* | 9/2007 | Wu | G06T 7/13 382/275 |
| 2008/0226171 | A1 | 9/2008 | Yin et al. | |
| 2008/0260256 | A1 | 10/2008 | Zeng et al. | |
| 2008/0292131 | A1* | 11/2008 | Takemoto | G06T 7/80 382/100 |
| 2015/0063684 | A1* | 3/2015 | Taylor | G06K 9/00771 382/154 |
| 2015/0117787 | A1* | 4/2015 | Chaudhury | G06T 5/006 382/199 |
| 2017/0076434 | A1* | 3/2017 | Pyo | G06T 3/60 |
| 2017/0309001 | A1* | 10/2017 | Zagaynov | G06T 7/13 |
| 2018/0232888 | A1* | 8/2018 | Thevenet | G06K 9/40 |

FOREIGN PATENT DOCUMENTS

| | | |
|---|---|---|
| CN | 101789122 A | 7/2010 |
| CN | 102012629 A | 4/2011 |
| CN | 102194212 A | 9/2011 |
| JP | 2002-057879 A | 2/2002 |
| JP | 2004-342067 A | 12/2004 |

OTHER PUBLICATIONS

Extended European Search Report dated Nov. 2, 2018, issued in European Patent Application No. 18176947.2.

Jian Liang, et al., "Camera-Based Document Image Mosaicing," 18th International Conference on Pattern Recognition, 2006, pp. 476-479.

Yusuke Takezawa, et al., "Camera-captured document image perspective distortion correction using vanishing point detection based on Radon Transform," 23rd International Conference on Pattern Recognition, 2016, pp. 3968-3974.

* cited by examiner

IMAGE PROCESSING APPARATUS, IMAGE PROCESSING METHOD, AND STORAGE MEDIUM

BACKGROUND OF THE INVENTION

Field of the Invention

The present invention relates to an image processing apparatus that generates a combined image by combining a plurality of images.

Description of the Related Art

Extracting information described on a paper document has been performed by capturing the paper document, such as a business form, by using a camera and performing character recognition. However, depending on the sheet size of a paper document and the resolution of an image sensing element of a camera, there is a case where information cannot be extracted with a sufficient accuracy from a captured image. Consequently, extracting information has been performed by capturing an entire sheet by dividing image capturing into a plurality of times in place of one-time image capturing, generating one image including the entire sheet by combining each image obtained by a plurality of times of image capturing, and performing character recognition for the generated combined image. Japanese Patent Laid-Open No. 2004-342067 has described a method of performing image combining by extracting feature points corresponding to each other in both images from the two images having an overlap area and by using transformation parameters of perspective projection transformation derived from the extracted feature points. Japanese Patent Laid-Open No. 2002-57879 has described a method of correcting a distortion of an image by vanishing point detection.

In the case where there is an error in the transformation parameters used at the time of combining images, there is a possibility that a distortion occurs in a combined image. Further, there is a case where portions that should originally be connected as a straight line (for example, ruled lines of a business form) are bent or the portions are not connected. Consequently, in order to make it possible to extract information with a sufficient accuracy for a combined image, it is necessary to suppress the above-described distortion and the shift in ruled lines of the image.

Consequently, an object of the present invention is to provide an image processing apparatus capable of calculating transformation parameters used for image combining with a small error and of making small a distortion that appears in a combined image that is generated finally.

SUMMARY OF THE INVENTION

The image processing apparatus according to the present invention includes: a feature point extraction unit configured to extract feature points corresponding to each other between both images from each of a first image and a second image, which are images obtained by capturing a paper document and whose captured ranges are different from each other; an edge extraction unit configured to extract edges corresponding to each other between both images from each of the images; a vanishing point detection unit configured to detect a vanishing point of a plane to which the paper document belongs from each of the images; a transformation parameter derivation unit configured to derive transformation parameters for image combining by using coordinates corresponding to intersections of straight lines connecting the extracted feature points and the detected vanishing point, and the extracted edges; and an image combining unit configured to combine the first image and the second image by using the derived transformation parameters.

Further features of the present invention will become apparent from the following description of exemplary embodiments with reference to the attached drawings.

DESCRIPTION OF THE EMBODIMENTS

First Embodiment

Figure 1:
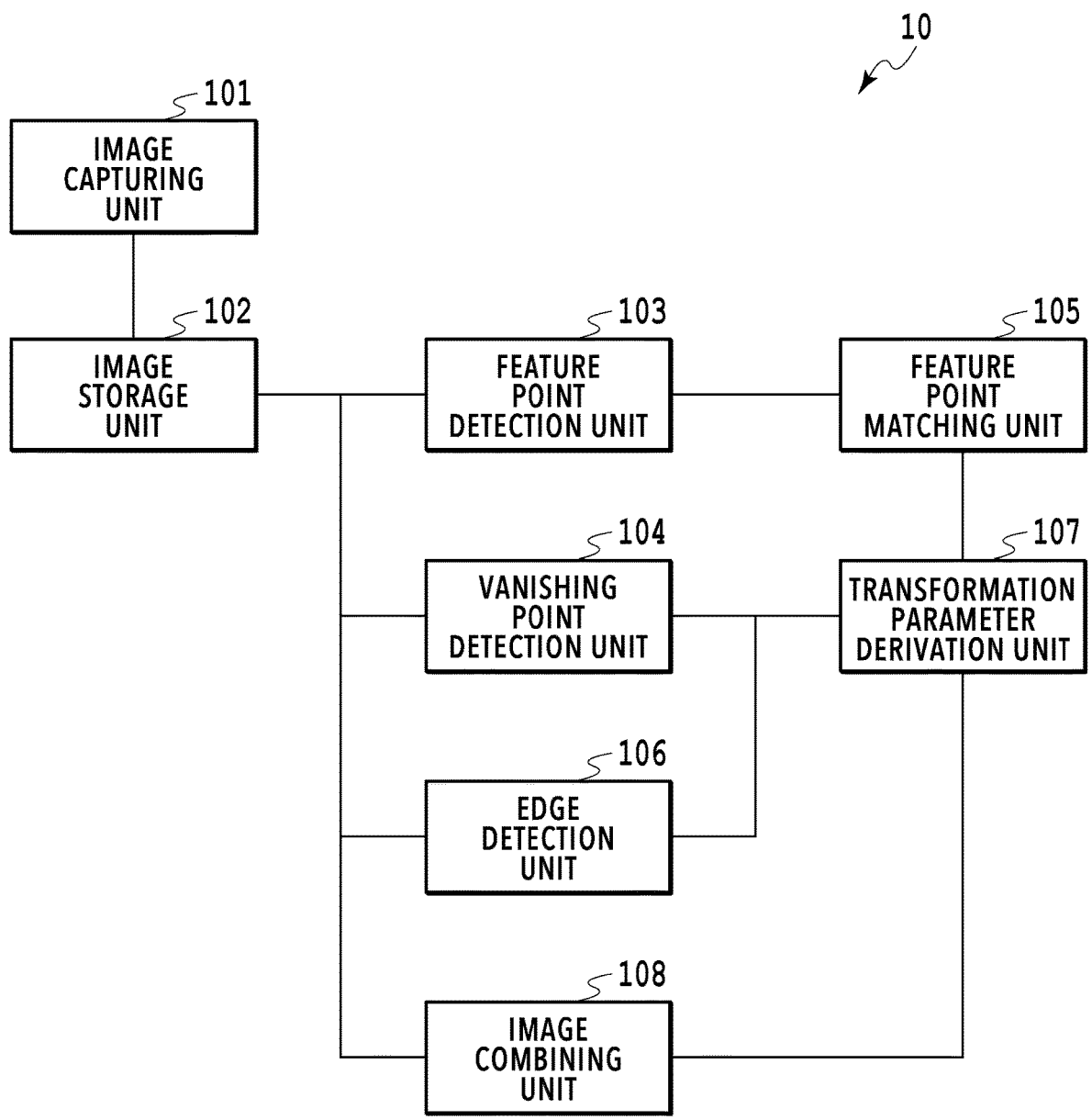
FIG. 1 is a block diagram showing a configuration of an image processing apparatus of a first embodiment of the present invention.

FIG. 1 is a block diagram showing a configuration of an image processing apparatus of a first embodiment of the present invention. An image processing apparatus 10 in the present embodiment includes an image capturing unit 101, an image storage unit 102, a feature point detection unit 103, a vanishing point detection unit 104, a feature point matching unit 105, an edge detection unit 106, a transformation parameter derivation unit 107, and an image combining unit 108. The image capturing unit 101 and the image storage unit 102 may be installed outside the image processing apparatus 10.

The image capturing unit 101 captures an object and acquires image data. In the present embodiment, a business form on the paper surface of which ruled lines are drawn vertically and horizontally is taken to be an object. The image storage unit 102 stores image data acquired by the image capturing unit 101. The image storage unit 102 is a storage device having, for example, a RAM, a flash memory, an HDD, and so on. The feature point detection unit 103 extracts a feature point from image data stored in the image storage unit 102. The feature point detection unit 103 detects a feature point by using a method, such as corner detection and SIFT, and extracts a feature amount normalized from peripheral pixels with the detected point as a center. The vanishing point detection unit 104 detects a vanishing point from image data stored in the image storage unit 102. The vanishing point detection unit 104 acquires a paper end, a ruled line, a line made up by detecting an area of one character and arranging a plurality of coordinates of the center of centroid thereof, and so on, each existing within an image represented by the image data, as straight lines extending toward a vanishing point. Then, the vanishing point detection unit 104 detects an intersection of those straight lines as a vanishing point. The feature point matching unit 105 calculates a degree of similarity by comparing a feature point obtained from image data by the feature point detection unit 103 and a feature amount that the feature point has between two pieces of image data. Then, the feature point matching unit 105 extracts feature points corresponding to each other between both pieces of image data. The edge detection unit 106 obtains a function representing a straight line by detecting an edge from image data stored in the image storage unit 102 and performing Hough transformation by using a pixel included in the detected edge. Then, the edge detection unit 106 extracts edges corresponding to each other between both pieces of image data. For edge detection, one of the methods, such as Sobel filter, Laplacian, and Canny, is used. It may also be possible to detect an edge by combining results obtained by a plurality of those methods. The transformation parameter derivation unit 107 derives transformation parameters for image combining. More specifically, the transformation parameter derivation unit 107 calculates transformation parameters (transformation matrix) of perspective projection transformation from a vanishing point acquired by the vanishing point detection unit 104, a feature point extracted by the feature point matching unit 105, and an edge (straight line) extracted by the edge detection unit 106. The image combining unit 108 generates combined image data by transforming a plurality of pieces of image data captured by the image capturing unit 101 in accordance with transformation parameters obtained by the transformation parameter derivation unit 107. Hereinafter, there is a case where image data is simply represented as an image.

Figure 2:
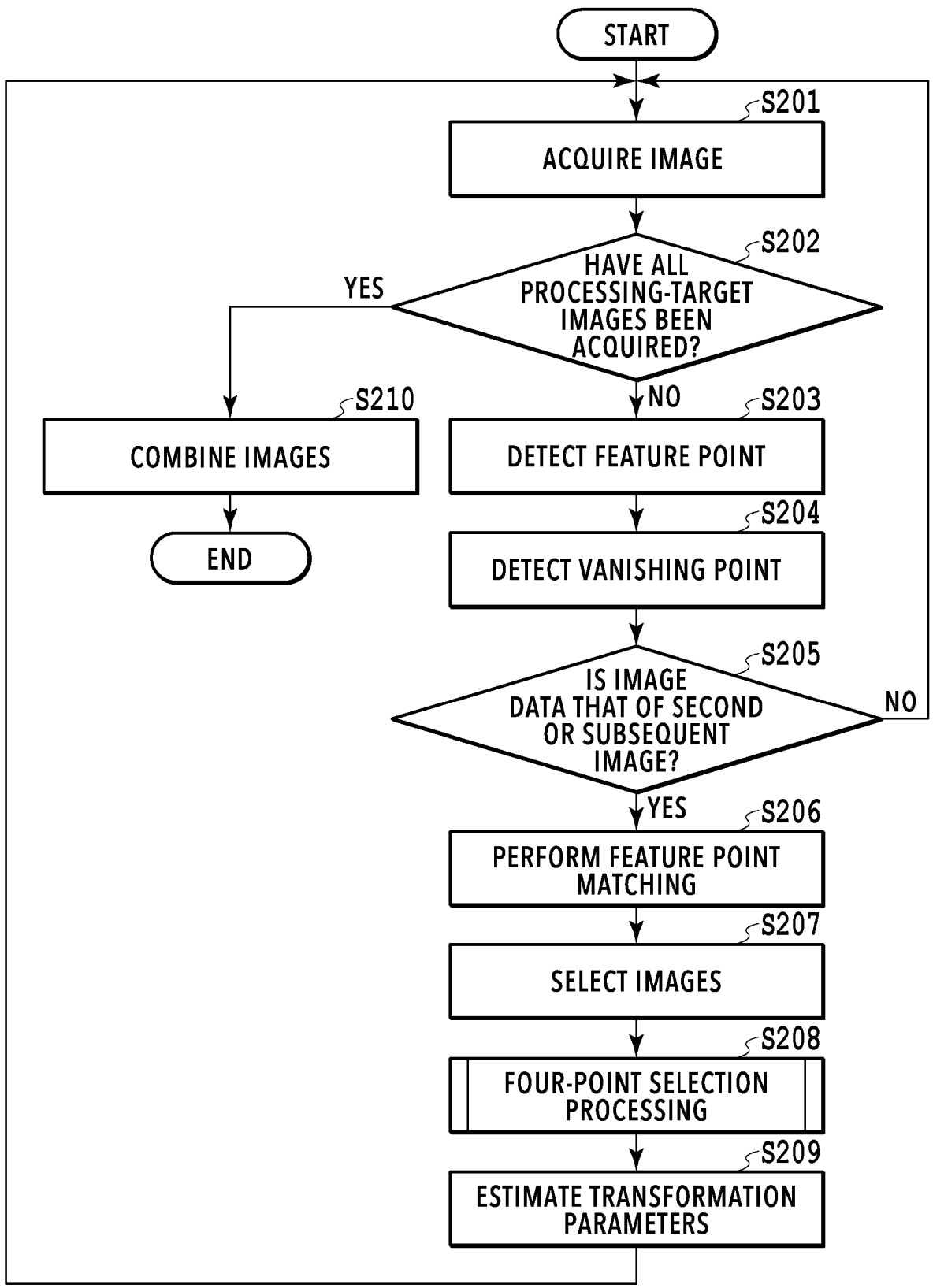
FIG. 2 is a flowchart showing a flow of processing until a combined image is generated from captured images.

FIG. 2 is a flowchart showing a flow of processing until a combined image is generated from captured images.

Figure 3C:
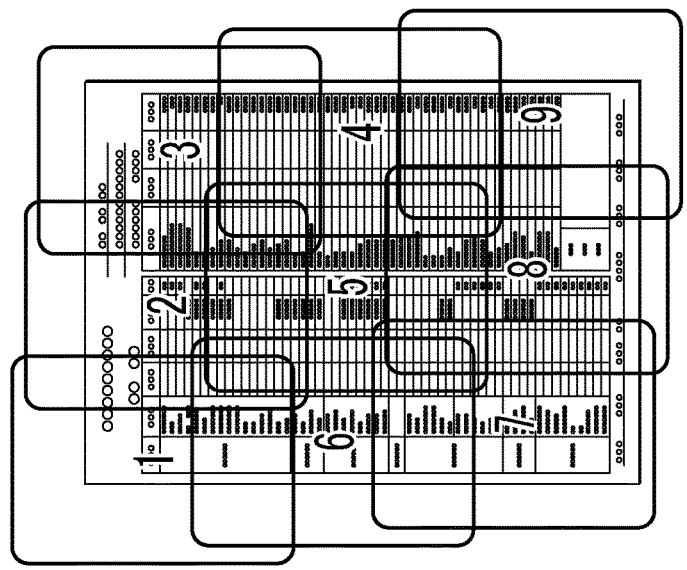
FIGS. 3A to 3C are diagrams showing the way a processing-target business form is captured by dividing image capturing into a plurality of times.
Figure 3B:
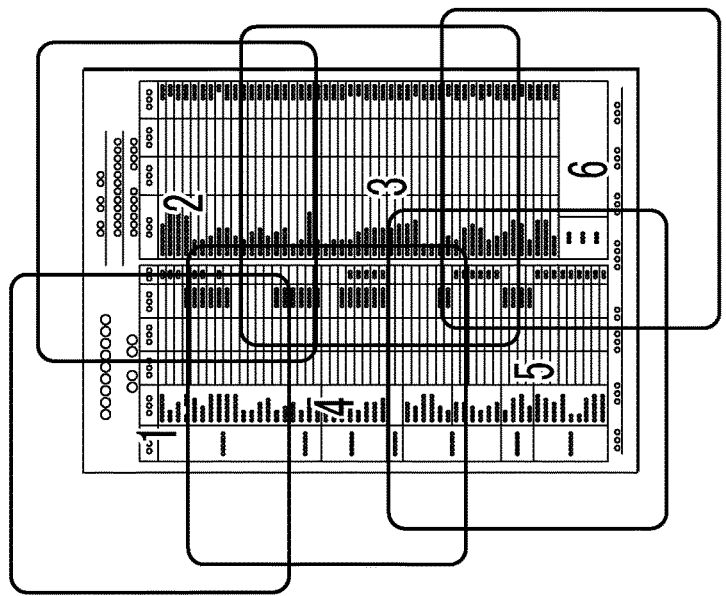
Figure 3A:
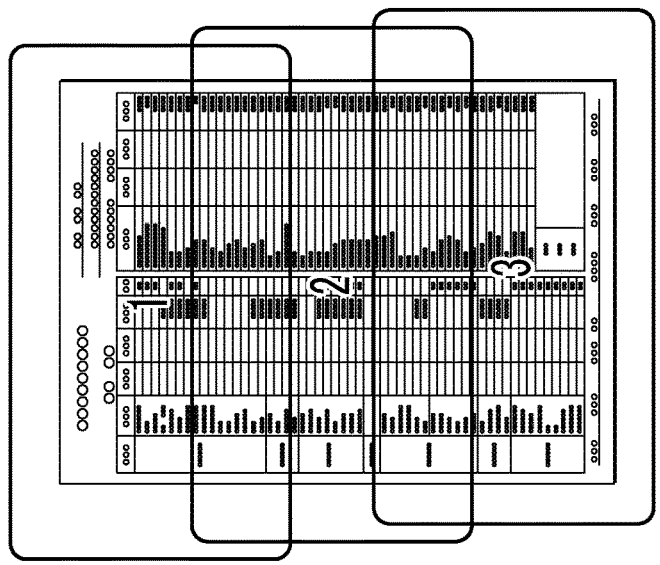

At step S201, the image capturing unit 101 acquires image data by capturing an object. The acquired image data is stored in the image storage unit 102. FIGS. 3A to 3C are diagrams showing the way a processing-target business form is captured by dividing image capturing into a plurality of times. FIG. 3A shows the way the entire business form is captured by dividing image capturing into three times. FIG. 3B shows the way the entire business form is captured by dividing image capturing into six times. FIG. 3C shows the way the entire business form is captured by dividing image capturing into nine times. A rectangular frame in the drawings indicates a captured range and a figure within the frame indicates what number captured range is the captured range. The method of capturing a business form may be a stationary image capturing method in which the position of an image capturing unit is fixed and the position of an object (sheet) is moved, or hand-held image capturing in which the position of an object is fixed and the position of an image capturing unit is moved. In the following, the case is taken as an example where the entire image of a business form is generated by combining six partial images different in the captured range, which are obtained by capturing the business form by handheld image capturing by dividing image capturing into six times as shown in FIG. 3B.

At step S202, the image combining unit 108 determines whether all the processing-target image data has been acquired. Here, the processing-target image data is six pieces of image data obtained by capturing the six captured ranges shown in FIG. 3B. In the case where all the processing-target image data has been acquired (YES at step S202), the processing advances to step S210. On the other hand, in the case where all the processing-target image data has not been acquired, the processing advances to step S203. It is possible to determine whether all the processing-target image data has been acquired by, for example, causing a user to perform an operation to indicate completion of image capturing. Further, it is also possible to perform determination by, for example, generating a combined image by taking reduced images as a target and detecting that the entire paper surface is included in the generated combined image.

At step S203, the feature point detection unit 103 performs processing to detect a feature point from image data newly acquired by the image capturing unit 101.

Figure 4:
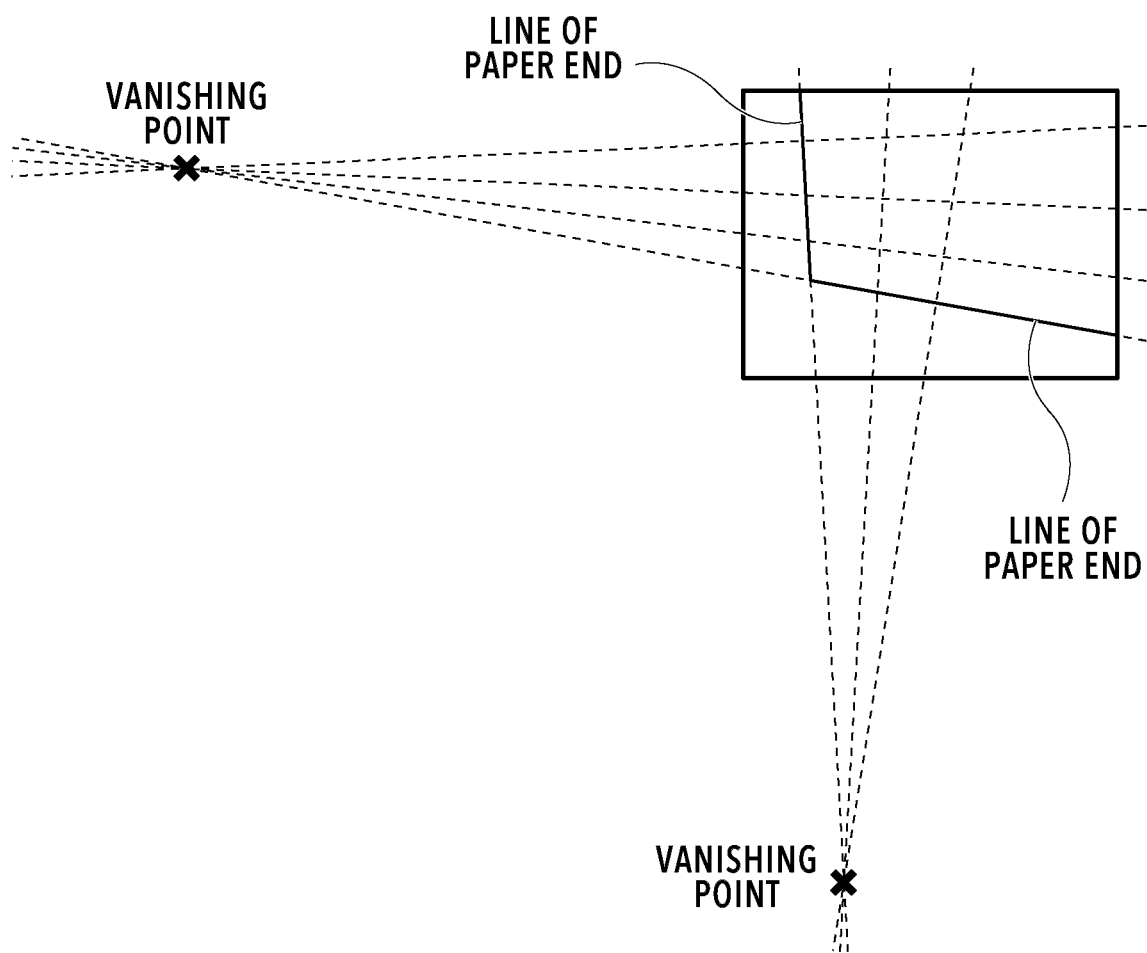
FIG. 4 is a diagram for explaining a detection method of a vanishing point.

At step S204, the vanishing point detection unit 104 performs processing to detect a vanishing point from the image data processed at step S203. FIG. 4 is a diagram for explaining a detection method of a vanishing point. FIG. 4 shows the way a vanishing point is detected from the image obtained by capturing the bottom-left portion (bottom left as one faces) of the business form. As shown in FIG. 4, the vanishing point detection unit 104 obtains a function representing a straight line by Hough transformation by performing edge detection and feature point detection from the image data. Then, the vanishing point detection unit 104 detects a vanishing point by collecting a large number of those functions and fitting the intersections of straight lines represented by each function using RANSAC (RANDom SAmple Consensus).

At step S205, the feature point matching unit 105 determines whether the image data processed at steps S203 and S204 is the image data of the second or subsequent image. In the case of the second or subsequent image (YES at step S205), the processing advances to step S206. In the case where the image data is not the image data of the second or subsequent image (NO at step S205), the processing returns to step S201.

At step S206, the feature point matching unit 105 performs feature point matching. Specifically, the feature point matching unit 105 uses the feature point detected from the image data newly acquired by the image capturing unit 101 as a key and performs matching with the feature point detected from the image data acquired earlier. Then, the feature point matching unit 105 extracts a feature point whose feature amount matches. In the case where a large number of feature points are extracted by the feature point extraction processing, the feature point matching unit 105 performs filtering of the feature points. In the present embodiment, the feature point matching unit 105 performs filtering of the feature points by selecting four sets of feature points from the extracted feature points to find transformation parameters of perspective projection transformation, fitting the transformation parameters by using RANSAC, and excluding the feature point that becomes an outlier.

Figure 5A:
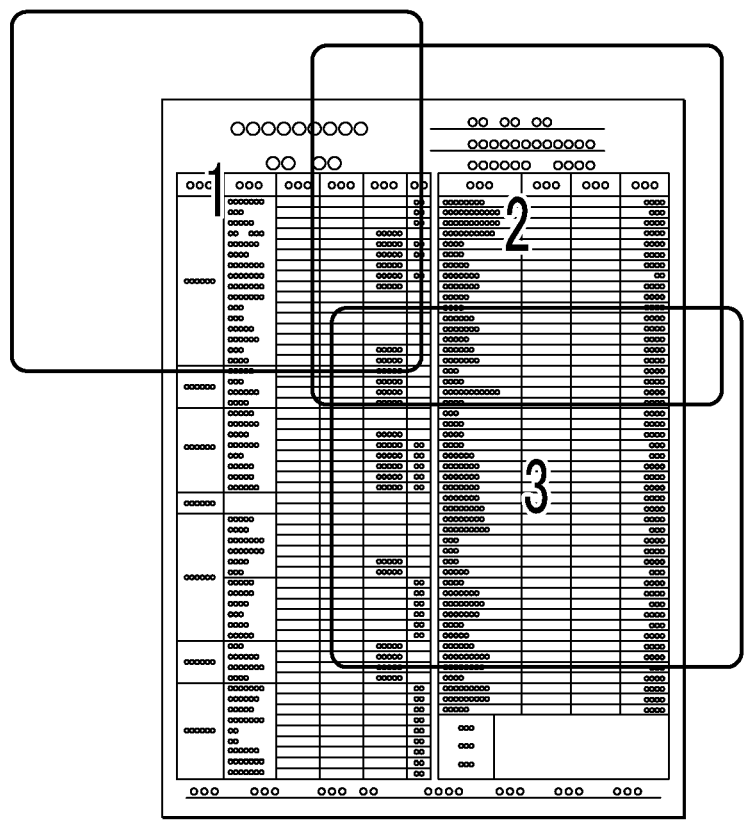
FIGS. 5A and 5B are diagrams for explaining combination of combination-target images.
Figure 5B:
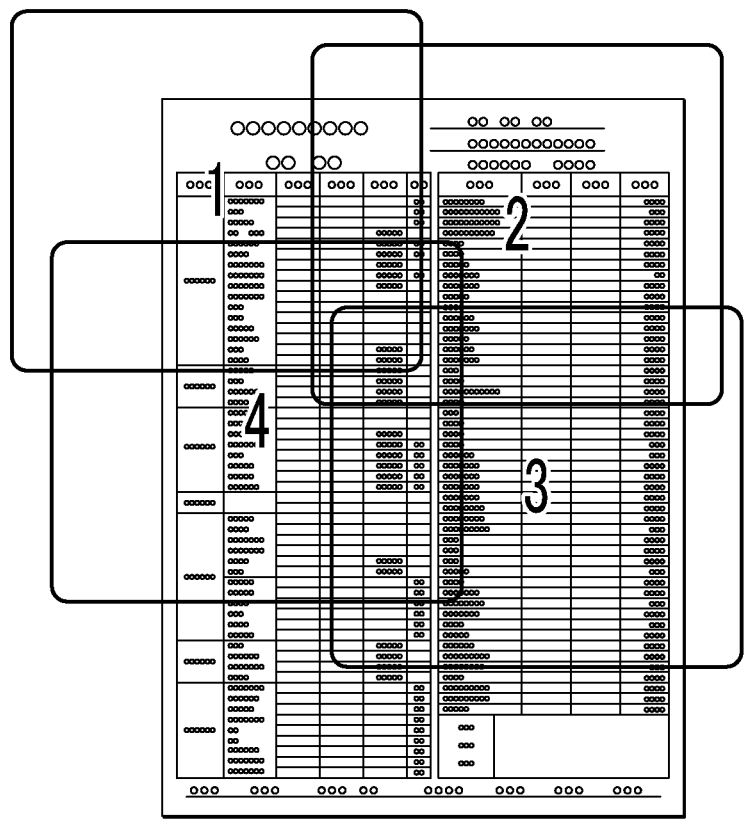

At step S207, the transformation parameter derivation unit 107 selects a combination of images for which the transformation parameters of perspective projection transformation are calculated, that is, a combination of images to be combined according to the feature point matching results obtained at step S206. As shown in FIG. 5A, in the case where the third image is captured, feature point matching is performed for the first image and the second image at step S206. There are overlap areas both in the first image and in the third image, and therefore, feature points that match are obtained between the first image and the third image. However, the overlap areas of the first image and the third image are small, and therefore, the transformation parameter derivation unit 107 does not select the combination of the first image and the third image as the combination for calculating the parameters of perspective projection transformation. Consequently, the combination of the second image and the third image is selected as the combination for calculating the parameters of perspective projection transformation. As shown in FIG. 5B, in the case where the fourth image is captured, overlap areas exist between the fourth image and each of the first image, the second image, and the third image. However, the overlap areas between the second image and the fourth image are small, and therefore, the first image and the third image are selected as the combination for calculating the parameters of perspective projection transformation for the fourth image.

At step S208, the combination of four points to be used for parameter calculation of perspective projection transformation, that is, the combination of four points necessary to combine two images is determined. This processing (hereinafter, referred to as four-point selection processing) is performed by the edge detection unit 106 and the transformation parameter derivation unit 107. Details of the four-point selection processing will be described later by using FIG. 6.

At step S209, the transformation parameter derivation unit 107 estimates (calculates) the parameters of perspective projection transformation from the combination of four points determined at step S208. By the processing at steps S206 to S209, for the image data newly acquired by the image capturing unit 101 at step S201, the transformation parameters for the image data acquired earlier are found.

At step S210, the image combining unit 108 performs image combining. Here, the image combining unit 108 combines the image data corresponding to the six captured ranges shown in FIG. 3B by using the transformation parameters found by the processing at steps S201 to S209. The image combining unit 108 combines images by selecting one image that is used as a source of combining and superimposing the other images on the selected image. As the image of the source of combining, the image captured first may be selected, the image captured last may be selected, or the image whose captured range is near the center of the business form may be selected. Further, it may also be possible to perform combining while changing the image of the source of combining. In this stage, the perspective projection distortion that the image of the source of combining has is not corrected. Consequently, the image combining unit 108 corrects the combined image into the state where the image is captured from the front by using information on the vanishing point detected from the image of the source of combining already extracted at step S204.

By the above processing, it is possible to generate one combined image by combining images obtained by a plurality of times of image capturing.

Figure 6:
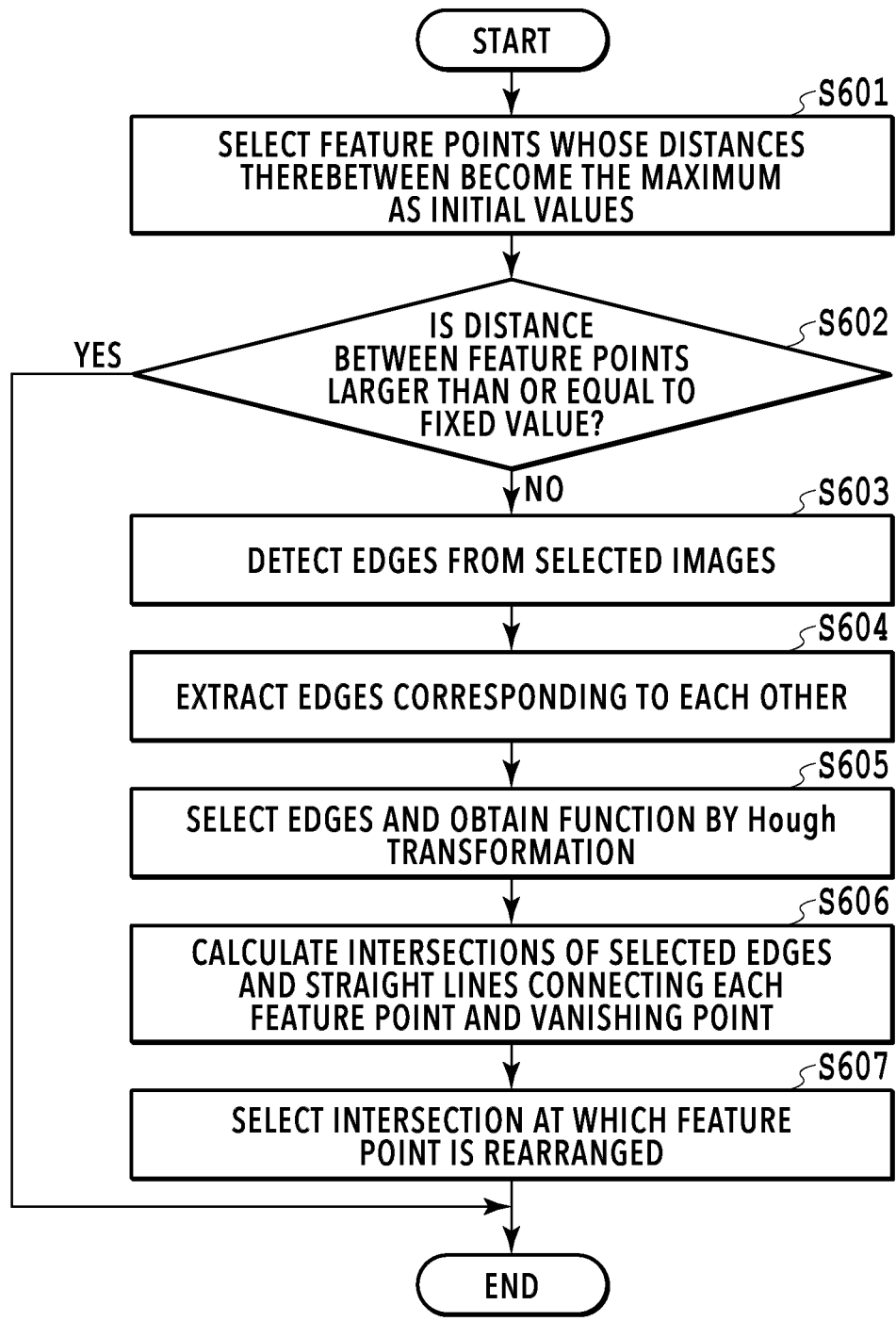
FIG. 6 is a flowchart showing four-point selection processing performed at step S208 in the first embodiment.

Next, by using FIG. 6, the four-point selection processing performed at step S208 is explained. FIG. 6 is a flowchart showing the four-point selection processing performed at step S208 in the first embodiment. In the case where the distances between four points to be used for parameter calculation of perspective projection transformation are small, on a condition that those points are caused to correspond to each other in units of pixels, the influence of an error in representation of a pixel appears significantly in the transformation parameters to be calculated. Because of this, in the following processing, four points to be used for parameter calculation of perspective projection transformation are selected so that distances between points become larger.

First, the transformation parameter derivation unit 107 determines a combination of four feature points whose distances therebetween become the maximum by taking the feature points that match by the processing at step S206 as a target and takes the feature points as initial values (step S601). The combination of feature points whose distances therebetween become the maximum is the combination that maximizes the distance between each feature point, that is, the combination that maximizes the area surrounded by each feature point.

Next, the transformation parameter derivation unit 107 determines whether each distance between feature points is larger than or equal to a fixed value determined in advance (step S602). For example, in the case where each feature point is 100 pixels or more apart from the other feature points on the image (YES at step S602), the transformation parameter derivation unit 107 determines that the influence on the parameters of perspective projection transformation is slight and terminates the processing. In this case, the transformation parameters are calculated from the coordinates of those feature points. In the case where the distance between feature points is less than the fixed value determined in advance (NO at step S602), the processing advances to step S603. In the processing at step S603 and subsequent steps, feature point replacement is performed. In the determination processing at step S602, it may also be possible to determine whether the area surrounded by each feature point is larger than or equal to a fixed value determined in advance in place of determining based on the distance between feature points.

Next, the edge detection unit 106 detects edges from the two images (step S603). By this edge detection processing, pixels on the edges are specified and the coordinates thereof can be acquired.

Next, the edge detection unit 106 performs edge extraction processing to extract edges corresponding to each other between both images from the edges detected at step S603 (step S604). By the conditions that no feature point is detected outside the paper surface and that there is a difference in color between the paper surface and the outside of the paper surface, it is possible to specify the edge of the paper end. Further, it is also possible to specify a straight line, such as a ruled line, included in the paper surface and it is possible to cause straight lines to correspond to each other between both images. For straight lines other than the paper end, it is possible to cause straight lines to correspond to each other by taking, for example, the edge of the paper end as a reference or information, such as a character and a feature point existing around those straight lines, as a reference.

Next, the edge detection unit 106 selects an edge at which a feature point is rearranged from the edges extracted by the processing at step S604 (step S605). In the present embodiment, the edge detection unit 106 selects the edge of the paper end and the edge most distant from the edge of the paper end and obtains a function representing a straight line by Hough transformation from the coordinates of pixels making up those edges. As shown in FIG. 3C, in the case where the business form is captured by dividing image capturing into nine times, the edge of the paper end is not detected from the center image. Consequently, for such an image, it is sufficient to select two edges whose distance therebetween is the largest from the extracted edges.

Next, the edge detection unit 106 finds straight lines connecting the four feature points obtained at step S601 and the vanishing point already detected at step S204 shown in FIG. 2 and finds intersections of those straight lines and the straight lines of the edges selected at step S605 (step S606). Each straight line is represented by a linear function, and therefore, the coordinates of the intersection are obtained in the state where information on coordinates of the fractional part is included.

Figure 7A:
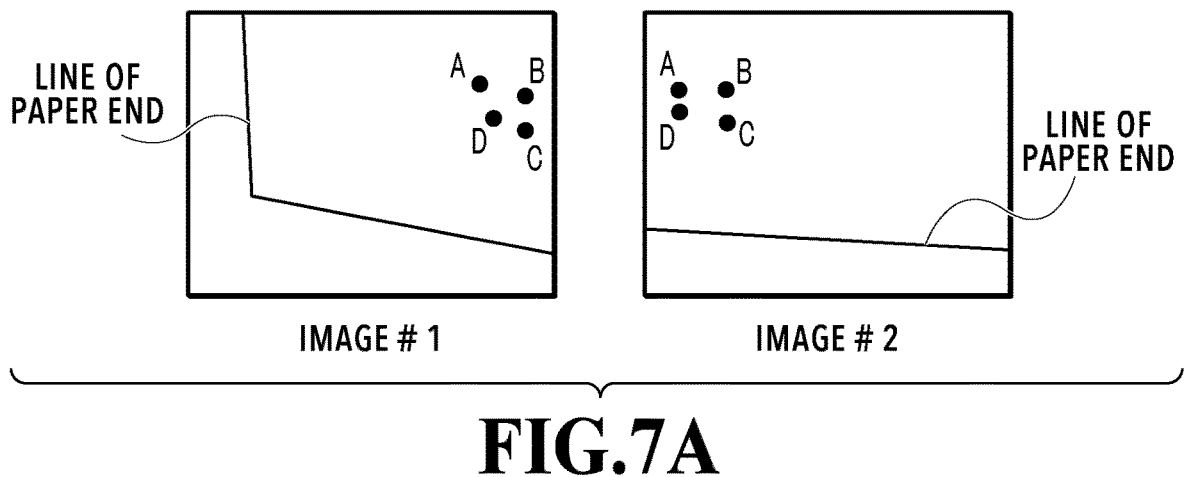
FIGS. 7A to 7C are diagrams showing the way four points used for parameter calculation of perspective projection transformation are selected in the first embodiment.
Figure 7B:
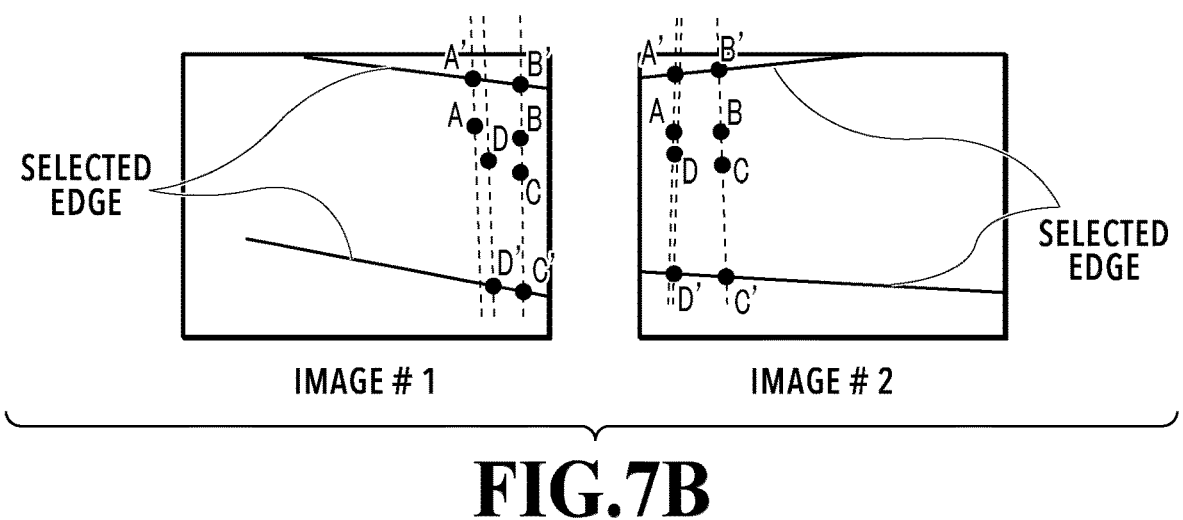

Next, the transformation parameter derivation unit 107 selects each intersection at which each feature point is rearranged from the intersections obtained at step S606 (step S607). In the case of finding transformation parameters for combining two images #1 and #2 shown in FIG. 7A, intersections A', B', C', and D' shown in FIG. 7B are selected. The line indicated by a broken line shown in FIG. 7B is a straight line connecting the feature point and the vanishing point. In the present embodiment, for each edge, the nearest feature point from the edge and the second nearest feature point from the edge are rearranged at the edge. Consequently, in FIG. 7B, feature points A and B are rearranged at the intersections A' and B' on the edge on the upper side and feature points C and D are rearranged at the intersections C' and D' on the edge on the lower side.

As described above, by rearranging the feature points A, B, C, and D at the intersections A', B', C', and D', it is possible to make the distance between feature points after rearrangement larger than the distance between feature points before rearrangement. Further, by rearranging the feature points A, B, C, and D at the intersections A', B', C', and D' on the straight lines, the straight lines overlap each other at the time of combining the two images. Because of this, it is possible to prevent the paper end of the business form and the ruled line within the business form from breaking off or bending, and therefore, it is possible to make less conspicuous a shift between images due to combining.

Figure 7C:
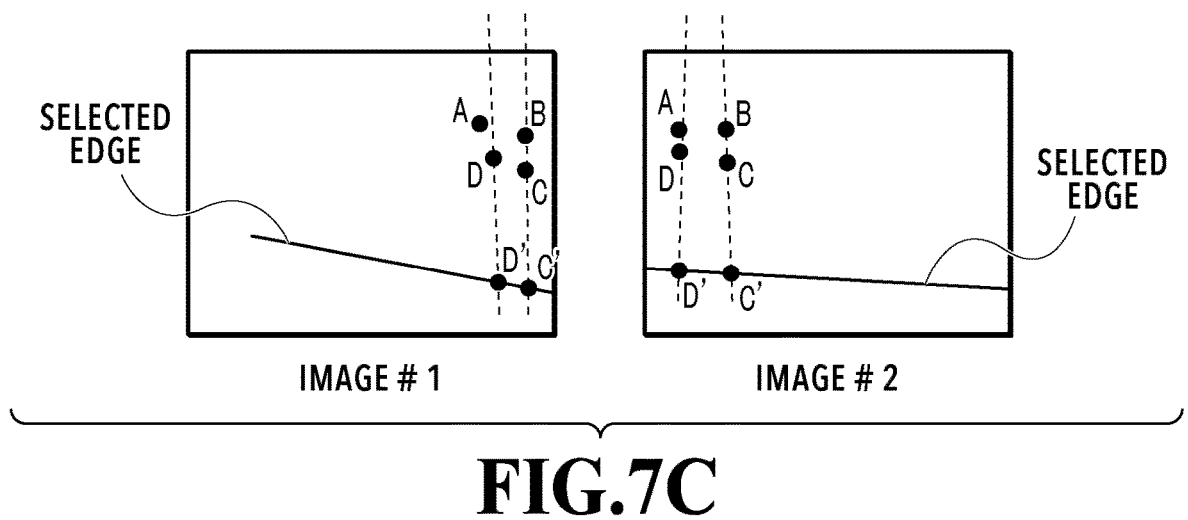

In the case where only one edge is found by the processing at step S604, only the nearest and second nearest feature points from the edge are rearranged. For example, as shown in FIG. 7C, in the case where the edges corresponding to each other between the two images are only the edges corresponding to the paper end, the feature points C and D are arranged at the intersections C' and D'.

As explained above, according to the present embodiment, it is possible to make the distances between four points necessary to calculate the transformation parameters for image combining as large as possible, and therefore, it is possible to find transformation parameters with a small error. Further, in the present embodiment, a point on an edge having information on coordinates of the fractional part is used to calculate the transformation parameters. Furthermore, in the present embodiment, coordinates of an intersection having information on coordinates of the fractional part is used to calculate the transformation parameters, and therefore, it is possible to make further smaller the error of the transformation parameters. As a result of this, it is possible to make smaller a distortion that appears in a combined image that is generated finally.

An image is represented as a set of pixels, the minimum units, and therefore, there is a case where one pixel in one of two images to be combined becomes a part of an area made up of a plurality of pixels in the other image. Because of this, there is a case where a straight line (paper end of paper document, ruled line within paper document) breaks off or bends in an image after combining. However, in the present embodiment, points on an edge are caused to correspond to each other, and therefore, even in the case where a paper document including ruled lines, such as a business form, is taken as an object, it is possible to prevent a straight line from breaking off or bending in an image after combining.

In the present embodiment, an image that is used as a reference at the time of image combining is selected and combining is performed by superimposing another image on the selected image. However, in the case where an error is included in the transformation parameters of perspective projection transformation, the influence of the error becomes greater as combining advances. Consequently, it may also be possible to perform combining in the order from combining using the transformation parameter considered to include a smaller error. According to such an aspect, it is possible to make smaller a distortion in an image that is generated finally. For example, in FIG. 3A, in the case where the distances between the four points extracted from the overlap areas of image #1 and image #2 are greater than the distances between the four points extracted from the overlap areas of image #2 and image #3, image #2 and image #3 are combined first. By sorting the combining orders according to the distances between the four points for finding the transformation parameters of perspective projection transformation, it is made possible to further make a distortion that appears in a combined image less conspicuous.

Further, in the case where it is determined that the distance between feature points is less than a fixed value at step S602, it may also be possible to prompt a user to perform image capturing again by notifying the user of a strong possibility that the image is distorted at the time of combining via a display device (not shown schematically) and the like. At this time, it may also be possible to notify the user of a range to be captured. For example, in the case where the overlap area with an adjacent image is not large enough, it may also be possible to prompt a user to move the range to be captured so as to increase the overlap area.

Further, in the present embodiment, combining of images is performed in the final stage. However, the vanishing point is already found at step S204, and therefore, it is possible to correct a perspective projection distortion of each image in advance. Consequently, it may also be possible to perform feature point detection and feature point matching after performing correction so that, for example, each image becomes an image as though captured from the front. In this case, each image after correction of a perspective projection distortion differs in scale from another image according to the image capturing distance, and therefore, it is necessary to correct and position images by affine transformation found by correspondence between three points. Consequently, the processing at step S208 is changed from the processing to select four points to processing to select three points and by the processing at step S209, transformation parameters (transformation matrix) of affine transformation are calculated. The other processing is the same as in the case where the transformation parameters of perspective projection are derived.

Further, in the present embodiment, the case is explained where a plurality of images captured by handheld image capturing is combined. However, it is possible to apply the present embodiment also in the case of combining a plurality of images captured by stationary image capturing in which the relationship between an image capturing unit and a plane (target plane) on which an image capturing target is placed is fixed as in a document camera. In such a case, on a condition that it is always possible to capture an image from the front, it is sufficient to find parameters of in-plane rotation (rotation matrix). At this time, it is possible to perform rotation and positioning in the case where a correspondence between two feature points existing in two images is known. From an image captured from the front, it is not possible to find a vanishing point at step S204. Because of this, at step S606, an intersection is found by drawing a perpendicular to a selected edge, such as the edge of the paper end, and the like.

Second Embodiment

Figure 8:
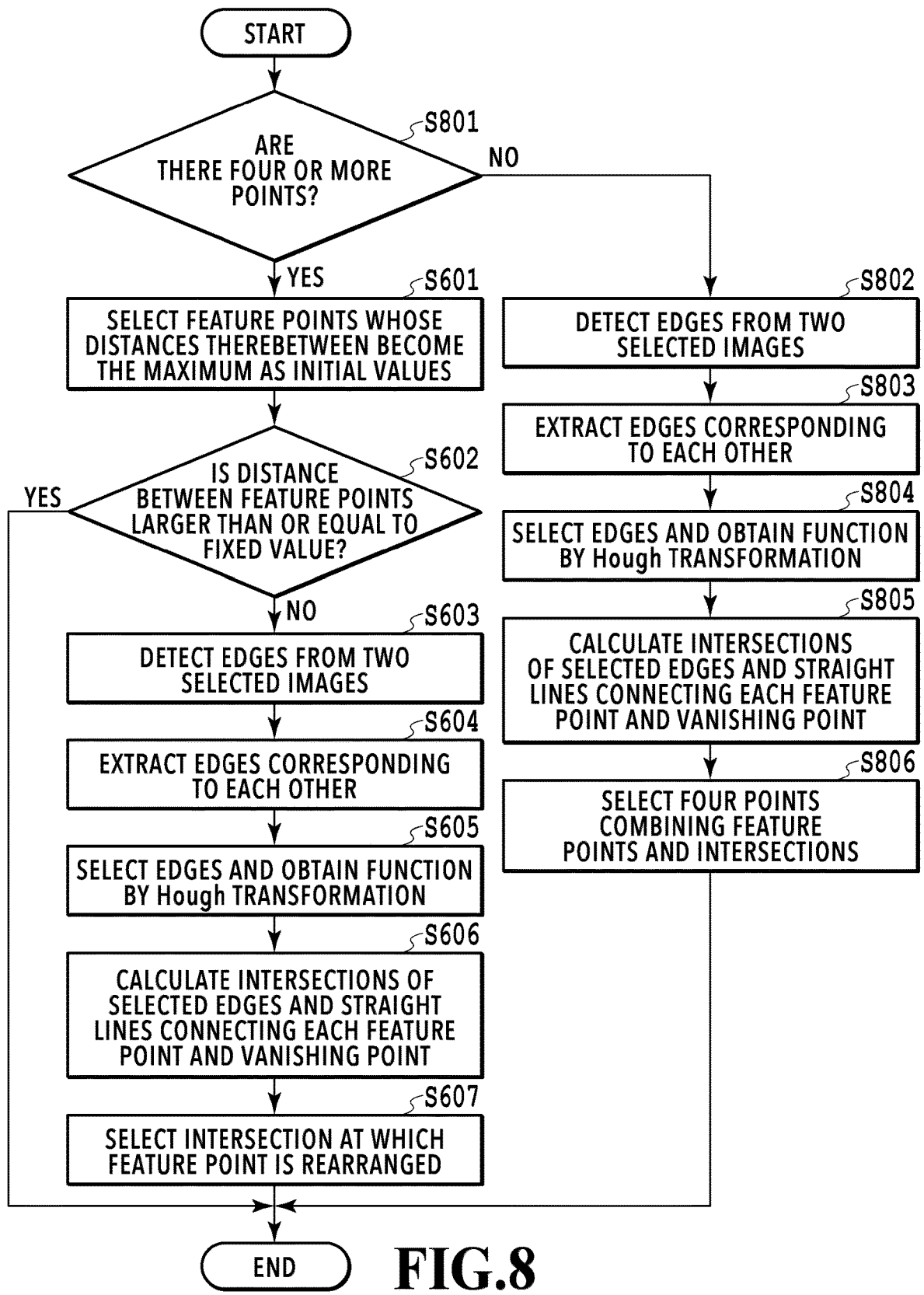
FIG. 8 is a flowchart showing four-point selection processing performed at step S208 in a second embodiment.

In the first embodiment, the example is explained in which the processing at step S208 (four-point selection processing) is performed in accordance with the flow shown in FIG. 6. However, depending on an image capturing target, there is a case where the number of feature points that match at step S206 is less than four. Processing in this case is explained by using FIG. 8. FIG. 8 is a flowchart showing four-point selection processing performed at step S208 in a second embodiment.

First, the transformation parameter derivation unit 107 determines whether there are four or more feature points extracted at step S206 (step S801). In the case where there are four or more points (YES at step S801), the processing in accordance with the flow shown in FIG. 6 (processing at steps S601 to S607) is performed. In the case where there are three or less points (NO at step S801), the processing advances to step S802.

Next, the edge detection unit 106 detects edges from two images (step S802). This processing is the same as that at step S603.

Next, the edge detection unit 106 extracts edges corresponding to each other between both images from the edges detected at step S802 (step S803). This processing is the same as that at step S604. However, in the first embodiment, only edges whose direction is the same as that of the edge of the paper end are found, but in the present embodiment, in the case where there is only one matching feature point, edges in the direction perpendicular to the edge of the paper end (hereinafter, simply referred to as edges in the perpendicular direction) are also extracted and caused to correspond to each other. In this case, the edges extracted from each image are caused to correspond to each other by the distance from the feature point and the direction with respect to the edge of the paper end.

Next, the edge detection unit 106 selects edges at which the feature point is rearranged from the edges extracted at step S803 (step S804). This processing is the same as that at step S605. However, in the case where there is only one matching feature point, the edge detection unit 106 selects the edge of the paper end and the edge most distant from the edge of the paper end, and at the same time, further selects two edges from the edges in the perpendicular direction, which are extracted at step S803. In the case where there are three or more edges in the perpendicular direction, two edges in opposition to each other with the feature point being sandwiched in between and whose distance therebetween is the largest are selected.

Next, the edge detection unit 106 finds straight lines connecting the feature points extracted at step S206 and the vanishing points detected at step S204 and finds intersections of those straight lines and the straight lines of the edges selected at step S804 (step S805). This processing is the same as the processing at step S606.

Figure 9A:
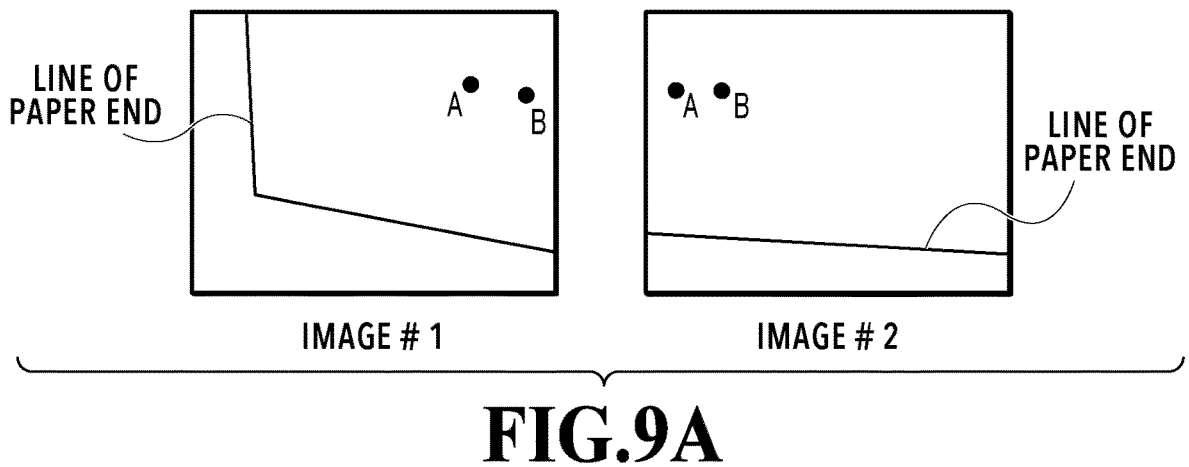
FIGS. 9A to 9C are diagrams showing the way four points used for parameter calculation of perspective projection transformation are selected in the second embodiment.
Figure 9B:
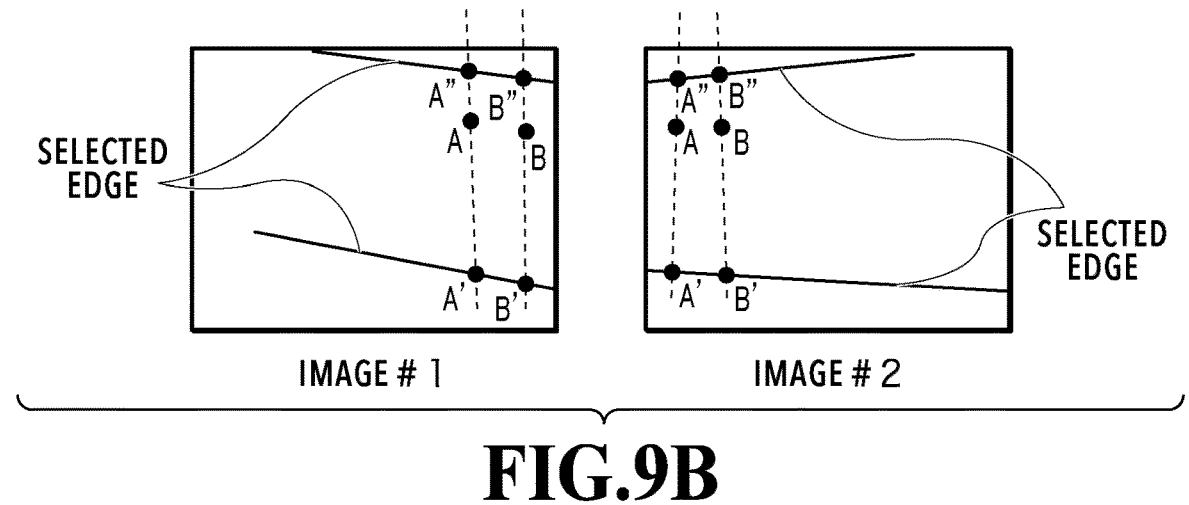
Figure 9C:
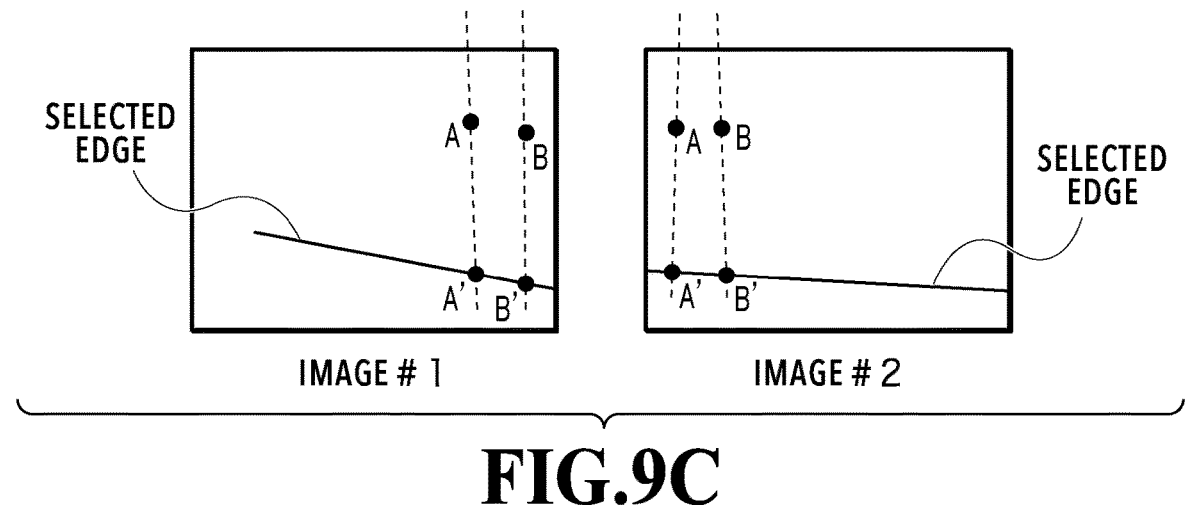

Next, the transformation parameter derivation unit 107 selects four points used to find the transformation parameters of perspective projection transformation from the feature points extracted at step S206 and the intersections obtained at step S805 (step S806). As shown in FIG. 9A, in the case where the feature points that match at step S206 are only feature points A and B, that is, less than four points, intersections A', B', A", and B" shown in FIG. 9B are selected. The intersections A' and B' shown in FIG. 9B are the intersections of the straight lines connecting the feature points and the vanishing points and the edge of the paper end. The intersections A" and B" are the intersections of the straight lines connecting the feature points and the vanishing points and the edge most distant from the edge of the paper end. In the case where there is only one edge extracted by the processing at step S803, for example, in the case where the edges corresponding to each other in two images is only the edge of the paper end as shown in FIG. 9C, the feature points A and B and the intersections A' and B' are selected.

Figure 10:
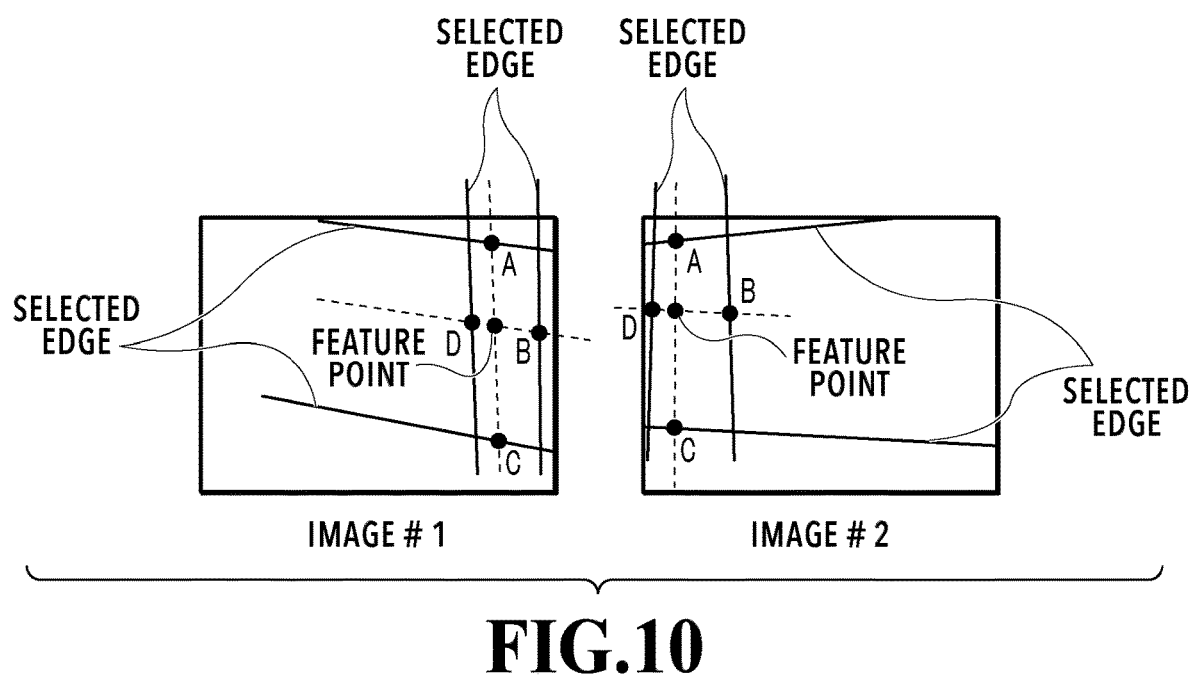
FIG. 10 is a diagram showing four points used for parameter calculation of perspective projection transformation, which are selected in the case where there is only one matching feature point.

As described above, in the present embodiment, in the case where there is only one feature point that matches at step S206, edges in the perpendicular direction are also extracted at step S803. Due to this, as shown in FIG. 10, it is possible to obtain the four intersections of the four edges including the edges in the perpendicular direction and the two straight lines obtained by connecting the two points, that is, the vanishing point and the feature point, as four points for finding the transformation parameters of perspective projection transformation. A point C shown in FIG. 10 represents the intersection of the straight line connecting the vanishing point and the feature point and the edge of the paper end. A point A shown in FIG. 10 represents the intersection of the straight line connecting the vanishing point and the feature point and the edge in the same direction of the edge of the paper end. Points B and D shown in FIG. 10 represent the intersections of the straight line connecting the feature point and the vanishing point and the edges in the perpendicular direction.

As described above, according to the present embodiment, even in the case where there are three or less matching feature points, it is also possible to extract four points for finding transformation parameters of perspective projection transformation, and therefore, it is possible to find transformation parameters with a small error as in the first embodiment.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to calculate transformation parameters used for image combining with a small error and to reduce a distortion that appears in a combined image that is generated finally.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-117235, filed Jun. 14, 2017, which is hereby incorporated by reference herein in its entirety.

What is claimed is:

1. An image processing apparatus comprising:
   a memory that stores one or more programs; and
   at least one processor that executes the one or more programs so as to function as a plurality of units comprising:
   (1) a feature point detection unit configured to detect feature points from both images of a first image and a second image, which are images of ranges of a paper document, wherein the ranges of the images are different from each other, and wherein the first image and the second image include overlap areas where a part of the paper document is comprised in the first image and in the second image;
   (2) a feature point extraction unit configured to extract feature points corresponding to each other among the feature points detected from both images of the first image and the second image by the feature point detection unit, wherein the extracted feature points are feature points corresponding to each other among the feature points detected from the overlap areas of the both images;
   (3) an edge extraction unit configured to extract edges corresponding to each other from the both images, wherein the extracted edges are edges of a paper end of the paper document and/or edges of a straight line included in the paper document;
   (4) a vanishing point detection unit configured to detect a vanishing point of a plane to which the paper document belongs from each of the images;
   (5) a transformation parameter derivation unit configured to rearrange at least one of the extracted feature points in each of the first image and the second image to a point having the coordinates of intersections of straight lines connecting the extracted feature points and the detected vanishing point, and the extracted edges, and further configured to derive transformation parameters for image combining by using coordinates of each of the feature points after the rearrangement, wherein a distance between the feature points after the rearrangement is larger than a distance between the feature points before the rearrangement; and
   (6) an image combining unit configured to combine the first image and the second image by using the derived transformation parameters.

2. The image processing apparatus according to claim 1, wherein the transformation parameter derivation unit rearranges at least one of the extracted feature points at the intersection in a case where the distance between the feature points before rearrangement is less than a fixed value.

3. The image processing apparatus according to claim 1, wherein the feature point extraction unit extracts four feature points corresponding to each other among the feature points detected from the both images, and
   wherein the transformation parameter derivation unit derives a transformation matrix of perspective projection transformation as the transformation parameters for image combining by using coordinates of the four feature points after rearrangement.

4. The image processing apparatus according to claim 3, wherein the transformation parameter derivation unit derives, in a case where feature points extracted by the feature point extraction unit are less than four in number, a transformation matrix of perspective projection transformation by using coordinates of four feature points selected from each of the feature points before rearrangement and each of the feature points after rearrangement.

5. The image processing apparatus according to claim 4, wherein the transformation parameter derivation unit selects four feature points so that distances therebetween become the maximum at the time of selecting four feature points from each of the feature points before rearrangement and each of the feature points after rearrangement.

6. The image processing apparatus according to claim 1, wherein the transformation parameter derivation unit selects, in a case where four or more feature points are extracted by the feature point extraction unit, four feature points whose distances therebetween become the maximum from the extracted feature points, and derives a transformation matrix of perspective projection transformation by using coordinates of the four feature points after rearrangement.

7. The image processing apparatus according to claim 1, wherein the feature point extraction unit extracts three feature points corresponding to each other among the feature points detected from the both images, and
   wherein the transformation parameter derivation unit derives transformation parameters of affine transformation as the transformation parameters for image combining by using coordinates of the three feature points after rearrangement.

8. The image processing apparatus according to claim 1, wherein the feature point extraction unit extracts two feature points corresponding to each other among the feature points detected from the both images, and
   wherein the transformation parameter derivation unit derives a rotation matrix as the transformation parameters for image combining by using coordinates of the two feature points after rearrangement.

9. The image processing apparatus according to claim 1, wherein the paper document is a business form having straight ruled lines.

10. An image processing method comprising:
    detecting feature points from both images of a first image and a second image, which are images of ranges of a paper document, wherein the ranges of the images are different from each other, and wherein the first image and the second image include overlap areas where a part of the paper document is comprised in the first image and in the second image;
    extracting feature points corresponding to each other among the feature points detected from both images of the first image and the second image, wherein the extracted feature points are feature points corresponding to each other among the feature points detected from the overlap areas of the both images;

extracting edges corresponding to each other from the both images, wherein the extracted edges are edges of a paper end of the paper document and/or edges of a straight line included in the paper document;

detecting a vanishing point of a plane to which the paper document belongs from each of the images;

rearranging at least one of the extracted feature points in each of the first image and the second image to a point having the coordinates of intersections of straight lines connecting the extracted feature points and the detected vanishing point, and the extracted edges, wherein a distance between the feature points after the rearrangement is larger than a distance between the feature points before the rearrangement;

deriving transformation parameters for image combining by using coordinates of each of the feature points after the rearrangement; and combining the first image and the second image by using the derived transformation parameters.

11. A non-transitory computer-readable storage medium storing a program for causing a computer to perform a method comprising:

detecting feature points from both images of a first image and a second image, which are images of ranges of a paper document, wherein the ranges of the images are different from each other, and wherein the first image and the second image include overlap areas where a part of the paper document is comprised in the first image and in the second image;

extracting feature points corresponding to each other among the feature points detected from both images of the first image and the second image, wherein the extracted feature points are feature points corresponding to each other among the feature points detected from the overlap areas of the both images;

extracting edges corresponding to each other from the both images, wherein the extracted edges are edges of a paper end of the paper document and/or edges of a straight line included in the paper document;

detecting a vanishing point of a plane to which the paper document belongs from each of the images;

rearranging at least one of the extracted feature points in each of the first image and the second image to a point having the coordinates of intersections of straight lines connecting the extracted feature points and the detected vanishing point, and the extracted edges, wherein a distance between the feature points after the rearrangement is larger than a distance between the feature points before the rearrangement;

deriving transformation parameters for image combining by using coordinates of each of the feature points after the rearrangement; and combining the first image and the second image by using the derived transformation parameters.

* * * * *